(12) United States Patent
Chiaramonte et al.

(10) Patent No.: US 6,382,075 B1
(45) Date of Patent: May 7, 2002

(54) SNUBBING ARRANGEMENT FOR A FLUID CYLINDER ASSEMBLY

(75) Inventors: Michael P. Chiaramonte, Bolingbrook; Philip F. Lange, Plainfield; Russell L. Stott, Sullivan, all of IL (US)

(73) Assignee: Caterpillar S.A.R.L. (CH)

( * ) Notice: Subject to any disclaimer, the term of this patent is extended or adjusted under 35 U.S.C. 154(b) by 0 days.

(21) Appl. No.: 09/609,783

(22) Filed: Jul. 5, 2000

(51) Int. Cl.$^7$ ............................................... F15B 15/22
(52) U.S. Cl. ........................................................ 91/399
(58) Field of Search ..................... 91/395, 399; 180/418

(56) References Cited

U.S. PATENT DOCUMENTS

| | | | |
|---|---|---|---|
| 3,845,694 A | | 11/1974 | Berg |
| 3,885,654 A | * | 5/1975 | Hauswirth .................... 91/395 |
| 3,979,998 A | * | 9/1976 | Wada .......................... 91/399 |
| 3,999,463 A | * | 12/1976 | Greenwood ................. 91/395 |
| 4,344,733 A | * | 8/1982 | Hirsch ........................ 414/694 |
| 4,352,318 A | * | 10/1982 | Kolchinsky et al. .......... 91/395 |
| 4,386,555 A | * | 6/1983 | Horiuchi et al. ............... 91/395 |
| 4,819,542 A | | 4/1989 | Fadeev et al. |
| 5,413,030 A | | 5/1995 | Richardson et al. |

FOREIGN PATENT DOCUMENTS

GB          1022489          3/1966

* cited by examiner

*Primary Examiner*—J. J. Swann
*Assistant Examiner*—L. Lum
(74) *Attorney, Agent, or Firm*—J. W. Burrows; John J. Cheek

(57) ABSTRACT

A snubbing arrangement functions to control the rate of deceleration of a piston and rod assembly within a fluid cylinder as the piston and rod assembly nears the bottom of the piston cavity. A flow blocking mechanism is attached to the piston and rod assembly and acts to block flow from the piston cavity through a first head end port. A pressure differential valve mechanism is disposed between a second head end port and the rod end port and operative to control the pressure in the head end cavity relative to the pressure in the rod end cavity.

17 Claims, 1 Drawing Sheet

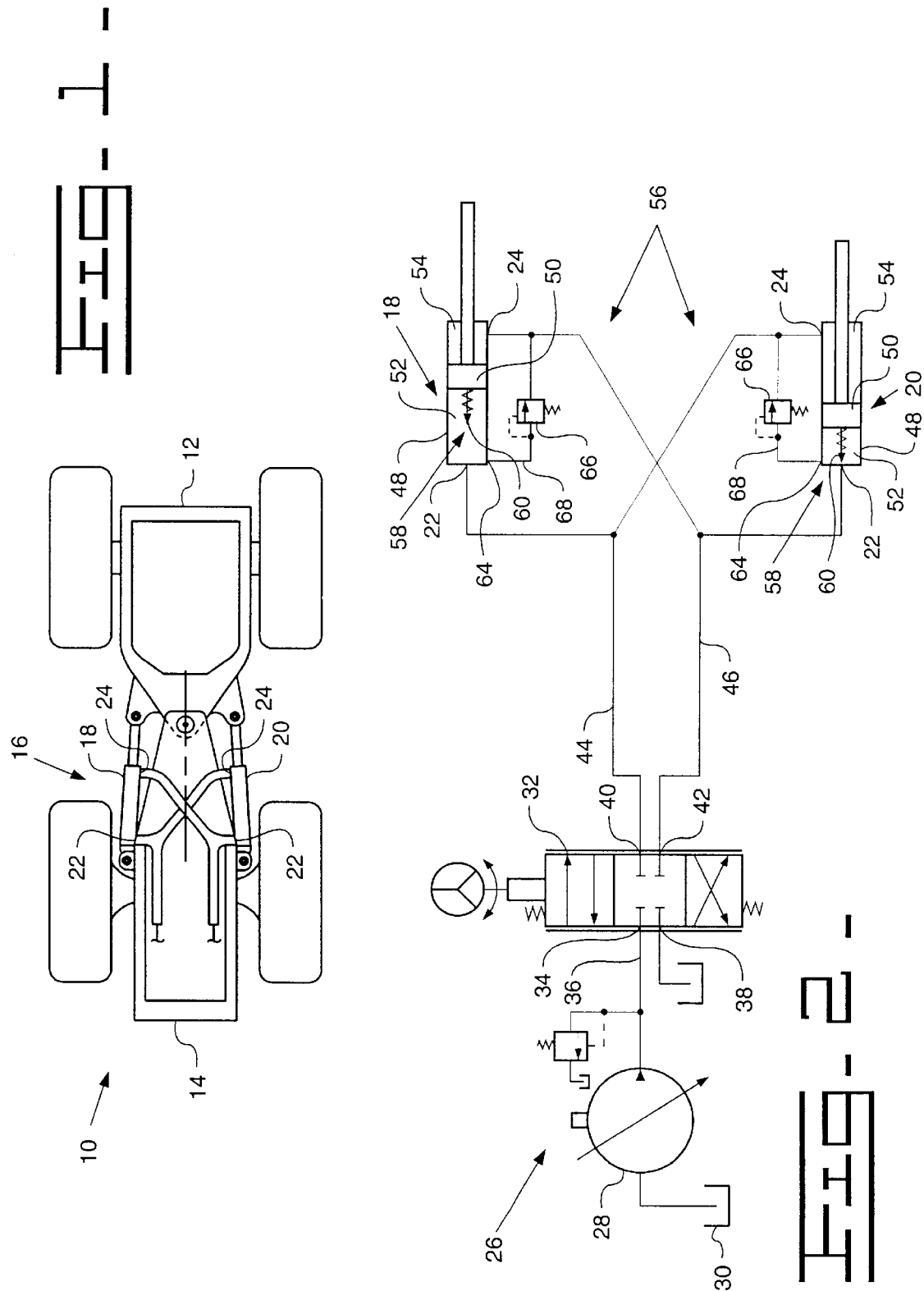

SNUBBING ARRANGEMENT FOR A FLUID CYLINDER ASSEMBLY

TECHNICAL FIELD

This invention relates generally to cushioning the end of travel of a hydraulic actuator and more particularly to a cylinder snubbing arrangement that controls the rate of deceleration.

BACKGROUND ART

Linear fluid actuators, such as hydraulic cylinders, are well known in the art. It is a well known problem that if the cylinder is allowed to "bottom out", that is the piston of the cylinder harshly impacts the bottom of the cylinder, damage can result from such impact. This damage may be to the cylinder or to components that the cylinder is connected. To reduce or eliminate such shocks, various types of end of stroke cushioning devices have been installed. One such device is set forth in U.S. Pat. No. 3,845,694 issued on Nov. 5, 1974 and assigned to Caterpillar Tractor Co. In this arrangement, small openings are provided in the cylinder body to direct pilot signals to a bypass valve that is operative to progressively restrict the flow from the end of the actuator and at the same time proportionally interconnect the ends of the cylinder. In the known cylinder snubbing arrangements, many modifications have been required within the cylinder body, piston, or rod or various complicated valving has been required. When a fluid cylinder is subjected to large differential pressures between the head end cavity and the rod end cavity, the life of the seals on the piston within the cylinder may prematurely leak or fail. It is desirable to provide an effective cylinder snubbing arrangement that is effective and simple in design.

The subject invention is directed to overcoming one or more of the problems as set forth above.

DISCLOSURE OF THE INVENTION

In one aspect of the present invention, a snubbing arrangement is provided for a fluid cylinder assembly used in a fluid system of a machine having the fluid cylinder assembly connected between two members. The fluid cylinder assembly includes a piston and rod assembly that is slideably disposed within a cylinder housing to define head and rod end cavities and respective head and rod end fluid ports. The snubbing arrangement includes a flow blocking mechanism connected to the piston of the fluid cylinder and operative to engage and block fluid exiting the head end fluid port prior to the piston reaching the bottom of the head end cavity, a second head end port connected to the head end cavity generally adjacent the bottom thereof and spaced from the first head end port, and a pressure differential valve mechanism connected between the second head end port and the rod end port and operative to control the pressure of the fluid within the head end cavity relative to the pressure within the rod end cavity.

BRIEF DESCRIPTION OF THE DRAWINGS

FIG. 1 is a diagrammatic representation of a machine incorporating an embodiment of the subject invention; and FIG. 2 is a schematic representation of the subject invention as incorporated in a fluid system.

BEST MODE FOR CARRYING OUT THE INVENTION

Referring to FIG. 1 of the drawings, a machine 10, such as an articulated machine, is illustrated. The articulated machine 10 includes two members, such as a front portion 12 and a rear portion 14 with a steering assembly 16 connected therebetween. The articulated machine 10 could be an articulated truck, an articulated wheel loader, an articulated tractor-scraper, or any other articulated machine that is steered by moving one portion of the machine relative to the other portion. The steering assembly 16 includes first and second fluid cylinder assemblies 18,20. Each of the fluid cylinders 18,20 has a head end port 22 and a rod end port 24. As illustrated, the head end port 22 of the first fluid cylinder 18 is connected to the rod end port 24 of the second fluid cylinder 20 and the head end port 22 of the second fluid cylinder 20 is connected to the rod end port 24 of the first fluid cylinder 18 in a well known manner. It is recognized that only one fluid cylinder could be used to steer the machine 10 but normally two fluid cylinders 18,20 are used.

Referring to FIG. 2, a fluid system 26 is illustrated for use with the steering assembly 16 of the machine 10 of FIG. 1. The fluid system 26 of FIG. 2 includes the first and second fluid cylinders 18,20, a source of pressurized fluid 28 that receives fluid from a reservoir 30, and a steering valve arrangement 32 disposed between the first and second fluid cylinders 18,20 and the source of pressurized fluid 28 and the reservoir 30.

The steering valve arrangement 32 has an inlet port 34 connected to the source of pressurized fluid 28 by a conduit 36, an exhaust port 38 connected to the reservoir 30, and first and second outlet ports 40,42. A conduit 44 connects the first outlet port 40 of the steering valve arrangement 32 with the head end port 22 of the first fluid cylinder assembly 18 and the rod end port 24 of the second fluid cylinder assembly 20. A conduit 46 connects the second outlet port 42 of the steering valve assembly 32 with the rod end port 24 of the first fluid cylinder assembly 18 and the head end port 22 of the second fluid cylinder assembly 20.

Each of the fluid cylinder assemblies 18,20 includes a cylinder housing 48 with a piston and rod assembly 50 slideably disposed therein to define a head end cavity 52 and a rod end cavity 54.

A snubbing arrangement 56 is provided and includes a flow blocking mechanism 58 connected to the piston and rod assembly 50. The blocking mechanism 58 includes a blocking member 60 that is connected to the piston of the piston and rod assembly 50 and is spring biased away from the piston and is permitted to collapse into the piston against the spring bias.

The snubbing arrangement 56 also includes a second head end port 64 that is connected to the head end cavity 52 generally adjacent the first head end port 22 but spaced therefrom. A pressure differential valve 66, such as a pressure relief valve, is disposed in a conduit 68 and is connected between the second head end port 64 and the rod end port 24. The pressure differential valve 66 is operative to control the pressure in the head end cavity 52 relative to the pressure in the rod end cavity 54.

It is recognized that various forms of the subject arrangement could be utilized without departing from the essence of the invention. For example, the steering valve arrangement 32 could be of the load sensing type, electrically controlled relative to a steer input, flow amplified or any other known type. Additionally, even though the description has been centered around an articulated machine 10, it is recognized that one of the fluid cylinder assemblies 18/20 could be connected between two members of a machine 10 and control snubbing of any type of load. For example, the fluid cylinder assembly 18 could be connected between the frame of the machine and an implement, such as a bucket.

INDUSTRIAL APPLICABILITY

In the operation of the fluid system 26 of FIG. 2 in the articulated machine 10 of FIG. 1, an input to the steering valve arrangement 32 results in the machine 10 being steered in a desired direction. For example, if the steering valve arrangement 32 is moved downward as viewed in the drawing, the first fluid cylinder assembly 18 would extend as illustrated by pressurized fluid being directed to the head end 22 of the first fluid cylinder assembly 18. The second fluid cylinder 20 would retract due to the pressurized fluid being directed to the rod end of the second fluid cylinder assembly 24. The exhaust fluid from the rod end port 24 of the first fluid cylinder 18 assembly and the head end port 22 of the second fluid cylinder assembly 20 passes to the reservoir 30 through the conduit 46 and across the steering valve arrangement 32. As viewed in FIG. 1, the machine 10 would steer downward if the machine was travelling in the rightward direction.

As the machine 10 is being steered or articulated in a given direction, there is a normal tendency for the machine to want to continue to articulate in that direction. Consequently, the respective piston and rod assemblies 50 may be moving faster than the source of pressurized fluid 28 can fill the respective head end and rod end cavities 52,54. In this event, the pressure of the fluid in the rod end cavity 24 of the first fluid cylinder assembly 18 and the head end cavity of the second fluid cylinder assembly 24 may be higher than the respective pressures in the opposed ends of the first and second fluid cylinder assemblies 18,20. The subject snubbing arrangement 56 functions to cushion or snub the piston and rod assembly 50 prior to it reaching the bottom of the respective fluid cavities.

This is accomplished as follows. Once the blocking element 60 of the flow blocking mechanism 58 reaches and blocks the flow exiting the head end cavity 52 of the second fluid cylinder assembly 20 into the conduit 46, the pressure within the head end cavity 52 quickly increases. Since the pressurized fluid within the head end cavity 52 is in communication with the pressure differential valve 66 through the second head end port 64, the pressure differential valve 66 reacts to the pressure within the head end cavity 52 of the second fluid cylinder assembly 20. Once the pressure within the head end cavity 52 reaches a predetermined level, fluid is bypassed from the head end cavity 52 of the second fluid cylinder assembly 20 to the rod end port 24 thereof. The fluid being bypassed across the pressure differential valve 66 quickly fills any fluid voids within the rod end cavity 54 and begins to pressurize the fluid therein. Once the fluid in the rod end cavity 54 of the second fluid cylinder assembly 20 is pressurized, the pressure therein opposes the fluid being bypassed thereto from the head end cavity 52. Consequently, as the pressure in the head end cavity 52 of the second fluid cylinder assembly 20 increases, a corresponding increase in pressure is being subjected to the rod end cavity 54 thereof. The difference between the pressures in the head end cavity 52 and the rod end cavity 54 thereof is the pressure setting of the pressure differential valve 66. By using the pressure of the fluid being bypassed to pressurize the rod end cavity 54 proportionally to the increasing pressure in the head end cavity 52, the fluid cylinder assembly 20 is not exposed to extreme external forces.

If the machine is being articulated in the opposite direction, the flow blocking mechanism 58 of the snubbing arrangement 56 connected to the piston and rod assembly 50 of the first fluid cylinder assembly 18 operates in a similar manner to effectively cushion and stop the piston and rod assembly 50 thereof before it reaches the bottom of the respective head and rod end cavities 52,54.

From the foregoing, it is readily apparent that the subject snubbing arrangement 56 is effective in cushioning and stopping the piston and rod assembly 50 prior to it reaching the bottom of the respective head and rod end cavities 52,54. By placing the pressure differential valve 66 between the head end cavity 52 and the rod end cavity 54, the pressure differential between the head end cavity 52 and the rod end cavity 54 is limited thus providing a smooth consistent stop even when stopping heavy loads or forces. By limiting the differential pressure between the head end cavity 52 and the rod end cavity 54, the life of the piston seals is extended. Likewise, it is apparent that the subject snubbing arrangement 56 is simple in construction.

Other aspects, objects and advantages of the invention can be obtained from a study of the drawings, the disclosure and the appended claims.

What is claimed is:

1. A snubbing arrangement for a fluid cylinder assembly used in a fluid system of a machine having the fluid cylinder assembly connected between two members, the fluid cylinder assembly having a piston and rod assembly slideably disposed within a cylinder housing to define head and rod end cavities, and respective head and rod end fluid ports, the snubbing arrangement comprising:

a flow blocking mechanism connected to the piston of the fluid cylinder assembly and operative to engage and block the head end fluid port prior to the piston reaching the bottom of the head end cavity;

a second head end port connected to the head end cavity generally adjacent the bottom thereof and spaced from the first head end port; and a pressure differential valve mechanism connected between the second head end port and the rod end port and operative to control the pressure of the fluid within the head end cavity relative to the pressure within the rod end cavity.

2. The snubbing arrangement of claim 1 wherein the flow blocking mechanism includes a blocking member that is spring biased to extend from the piston and rod assembly a predetermined distance and retracts towards the piston and rod assembly once the blocking member engages and blocks the first fluid port and the piston continues to move towards the bottom of the head end cavity.

3. The snubbing arrangement of claim 2 wherein the pressure differential valve mechanism is a pressure relief valve.

4. The snubbing arrangement of claim 2 wherein the fluid cylinder assembly is a steering assembly connected between front and rear portions of an articulated machine.

5. A method for cushioning the impact of a piston and rod assembly of a fluid cylinder assembly against the bottom of a head end cavity, the fluid cylinder assembly having a head end port and a rod end port, the method includes the steps of:

providing a flow blocking mechanism on the piston and rod assembly of the fluid cylinder assembly;

providing a second head end port connected to the head end cavity generally adjacent the bottom thereof and spaced from the first head end port; and connecting a pressure differential valve mechanism between the second head end port and the rod end port to control the pressure in the head end cavity relative to the pressure in the rod end cavity.

6. The method of claim 5 wherein in the step of connecting a pressure differential valve mechanism, the pressure differential valve mechanism is a pressure relief valve.

7. The method of claim 5 including the step of installing the cylinder piston assembly between a front portion and a rear portion of an articulated machine for steering of the machine.

8. A work machine, comprising:

a front portion;

a rear portion pivotally connected with the front portion;

at least one fluid cylinder assembly connected between the front portion and the rear portion and operable to provide relative pivotal movement between the front portion and the rear portion to steer the work machine, the fluid cylinder assembly having a piston and rod assembly slideably disposed within a cylinder housing to define head and rod end cavities, said fluid cylinder assembly further having a first head end fluid port and a rod end fluid port; and a snubbing arrangement according to claim 1 for the fluid cylinder assembly.

9. A snubbing arrangement for a fluid cylinder assembly used in a fluid system of a machine having the fluid cylinder assembly connected between two members, the fluid cylinder assembly having a piston and rod assembly slideably disposed within a cylinder housing to define head and rod end cavities, said fluid cylinder assembly further having a first head end fluid port and a rod end fluid port, the snubbing arrangement comprising:

a flow blocking mechanism operable by movement of the piston and rod assembly toward the bottom end of the head end cavity to block the first head end fluid port prior to the piston reaching the bottom of the head end cavity;

a second head end port connected to the head end cavity and spaced from the first head end port; and a pressure differential valve mechanism connected between the second head end port and the rod end port of the fluid cylinder assembly.

10. The snubbing arrangement of claim 9 wherein the flow blocking arrangement includes a spring-biased blocking member.

11. The snubbing arrangement of claim 9 wherein said flow blocking mechanism is connected to the piston of the fluid cylinder assembly.

12. The snubbing arrangement of claim 11 wherein the flow blocking mechanism includes blocking member that is spring biased to extend from the piston and rod assembly a predetermined distance and retracts towards the piston and rod assembly once the blocking member engages and blocks the first head end fluid port.

13. The snubbing arrangement of claim 11 wherein the second head end port is located generally adjacent the bottom end of the head end cavity.

14. The snubbing arrangement of claim 9 wherein the second head end port is located generally adjacent the bottom end of the head end cavity.

15. The snubbing arrangement of claim 9 wherein the pressure differential valve mechanism is a pressure relief valve.

16. The snubbing arrangement claim 9 wherein the fluid cylinder assembly is a steering assembly connected between front and rear portions of an articulated machine.

17. A work machine, comprising:

a front portion;

a rear portion pivotally connected with the front portion;

at least one fluid cylinder assembly connected between the front portion and the rear portion and operable to provide relative pivotal movement between the front portion and the rear portion to steer the work machine, the fluid cylinder assembly having a piston and rod assembly slideably disposed within a cylinder housing to define head and rod end cavities, said fluid cylinder assembly further having a first head end fluid port and a rod end fluid port; and a snubbing arrangement according to claim 8 for the fluid cylinder assembly.

\* \* \* \* \*